(12) United States Patent
Rofougaran

(10) Patent No.: US 8,406,721 B2
(45) Date of Patent: Mar. 26, 2013

(54) METHOD AND SYSTEM FOR REUSING ANTENNAS IN A MULTI-ANTENNA SYSTEM WHILE OPERATING IN A NARROWBAND RECEIVING MODE

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 1215 days.

(21) Appl. No.: 11/536,670

(22) Filed: Sep. 29, 2006

(65) Prior Publication Data

US 2008/0081587 A1 Apr. 3, 2008

(51) Int. Cl.
*H04B 7/02* (2006.01)
*H04B 1/16* (2006.01)

(52) U.S. Cl. .................................. 455/278.1; 455/63.1

(58) Field of Classification Search .............. 455/67.11, 455/296, 307, 63.1, 272, 273, 276.1, 277.1, 455/278.1
See application file for complete search history.

(56) References Cited

U.S. PATENT DOCUMENTS

| | | | | |
|---|---|---|---|---|
| 4,723,321 A | * | 2/1988 | Saleh | 455/295 |
| 4,893,350 A | * | 1/1990 | Minamisono et al. | 455/278.1 |
| 5,349,609 A | * | 9/1994 | Tsujimoto | 375/347 |
| 5,487,091 A | * | 1/1996 | Jasper et al. | 375/347 |
| 5,974,301 A | * | 10/1999 | Palmer et al. | 455/63.1 |
| 6,081,566 A | * | 6/2000 | Molnar et al. | 375/347 |
| 6,968,171 B2 | * | 11/2005 | Vanderhelm et al. | 455/296 |
| 7,277,679 B1 | * | 10/2007 | Barratt et al. | 455/101 |
| 7,336,745 B2 | * | 2/2008 | Casabona et al. | 375/346 |
| 7,373,129 B2 | * | 5/2008 | Fukuda et al. | 455/296 |
| 7,385,944 B2 | * | 6/2008 | Kong et al. | 370/328 |
| 7,586,863 B2 | * | 9/2009 | Tu et al. | 370/311 |
| 2004/0264403 A1 | | 12/2004 | Fette et al. | |

OTHER PUBLICATIONS

European Search Report corresponding to European Patent Application No. 07008146.8-1246, dated Mar. 27, 2008, 6 pages.

* cited by examiner

*Primary Examiner* — Blane J Jackson

(74) *Attorney, Agent, or Firm* — Farjami & Farjami LLP

(57) ABSTRACT

Certain aspects of a method and system for reusing antennas in a multi-antenna system are disclosed. Aspects of one method may include suppressing a blocking signal received via at least one of a plurality of receiving antennas that is unused within a wideband diversity radio frequency (RF) receiver comprising a plurality of receiving antennas, when the wideband diversity RF receiver is operating in a narrowband receiving mode. The phase of the combined blocking signal and received data signal at the unused antenna may be adjusted to suppress the blocking signal.

21 Claims, 5 Drawing Sheets

METHOD AND SYSTEM FOR REUSING ANTENNAS IN A MULTI-ANTENNA SYSTEM WHILE OPERATING IN A NARROWBAND RECEIVING MODE

CROSS-REFERENCE TO RELATED APPLICATIONS/INCORPORATION BY REFERENCE

This application makes reference to:
U.S. application Ser. No. 11/536,678, filed on Sep. 29, 2006;
U.S. application Ser. No. 11/536,682, filed on Sep. 29. 2006;
U.S. application Ser. No. 11/536,650, filed on Sep. 29, 2006;
U.S. application Ser. No. 11/536,644, filed on Sep. 29, 2006;
U.S. application Ser. No. 11/536,676, filed on Sep. 29, 2006;
U.S. application Ser. No. 11/536,659, filed on Sep. 29, 2006;
U.S. application Ser. No. 11/536,673, filed on Sep. 29. 2006;
U.S. application Ser. No. 11/536,679, filed on Sep. 29, 2006;
U.S. application Ser. No. 11/536,672, filed on Sep. 29. 2006;
U.S. application Ser. No. 11/536,648, filed on Sep. 29, 2006;
U.S. application Ser. No. 11/536,669, filed on Sep. 29, 2006;
U.S. application Ser. No. 11/536,666, filed on Sep. 29, 2006;
U.S. application Ser. No. 11/536,675, filed on Sep. 29, 2006;
U.S. application Ser. No. 11/536,685, filed on Sep. 29, 2006;
U.S. application Ser. No. 11/536,645, filed on Sep. 29, 2006;
U.S. application Ser. No. 11/536,655, filed on Sep. 29, 2006;
U.S. application Ser. No. 11/536,660, filed on Sep. 29, 2006;
U.S. application Ser. No. 11/536,657, filed on Sep. 29, 2006;
U.S. application Ser. No. 11/536,662, filed on Sep. 29, 2006;
U.S. application Ser. No. 11/536,688, filed on Sep. 29. 2006;
U.S. application Ser. No. 11/536,667, filed on Sep. 29, 2006;
U.S. application Ser. No. 11/536,651, filed on Sep. 29, 2006;
U.S. application Ser. No. 11/536,656, filed on Sep. 29, 2006; and
U.S. application Ser. No. 11/536,663, filed on Sep. 29, 2006.

Each of the above stated applications are hereby incorporated herein by reference in its entirety.

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the invention relate to wireless communication systems. More specifically, certain embodiments of the invention relate to a method and system for reusing antennas in a multi-antenna system.

BACKGROUND OF THE INVENTION

In most current wireless communication systems, nodes in a network may be configured to operate based on a single transmit and a single receive antenna. However, for many of the current wireless systems, the use of multiple transmit and/or receive antennas may result in an improved overall system performance. These multi-antenna configurations, also known as smart antenna techniques, may be utilized to reduce the negative effects that multipath and/or signal interference may have on signal reception. Existing systems and/or or systems which are being currently deployed, for example, CDMA-based systems, TDMA-based systems, WLAN systems, and OFDM-based systems such as IEEE 802.11 a/g/n, may benefit from configurations based on multiple transmit and/or receive antennas. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and array gain and to suppress interference generated within the signal reception process. Such diversity gains improve system performance by increasing received signal-to-noise ratio, by providing more robustness against signal interference, and/or by permitting greater frequency reuse for higher capacity In communication systems that incorporate multi-antenna receivers, a set of M receive antennas may be utilized to null the effect of (M-1) interferers. Accordingly, N signals may be simultaneously transmitted in the same bandwidth using N transmit antennas, with the transmitted signal then being separated into N respective signals by way of a set of N antennas deployed at the receiver. Systems that utilize multiple transmit and multiple receive antenna may be referred to as multiple-input multiple-output (MIMO) systems One attractive aspect of multi-antenna systems, in particular MIMO systems, is the significant increase in system capacity that may be achieved by utilizing these transmission configurations For a fixed overall transmitted power, the capacity offered by a MIMO configuration may scale with the increased signal-to-noise ratio (SNR).

However, the widespread deployment of multi-antenna systems in wireless communications, particularly in wireless handset devices, has been limited by the increased cost that results from increased size, complexity, and power consumption. The necessity of providing a separate RF chain for each transmit and receive antenna is a direct factor in the increased cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is, therefore, apparent that as the number of transmit and receive antennas increases, the system complexity, power consumption, and overall cost may also increase.

In the case of a single RF chain with multiple antennas, there is a need to determine or estimate separate propagation channels. A simple method may comprise switching to a first receive antenna utilizing, for example, an RF switch, and estimate a first propagation channel. After estimating the first propagation channel, another receive antenna may be selected and its corresponding propagation channel may be estimated. In this regard, this process may be repeated until all the channels have been estimated However, switching between receive antennas may disrupt the receiver's modem and may lower throughput. Moreover, this approach may require additional hardware and may also result in propagation channel estimates at different time intervals.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for reusing antennas in a multi-antenna system, substantially as shown in and/or described in connection with at least one of the figures, as set forth more completely in the claims.

These and other advantages, aspects and novel features of the present invention, as well as details of an illustrated embodiment thereof will be more fully understood from the following description and drawings.

DETAILED DESCRIPTION OF THE INVENTION

Certain embodiments of the invention may be found in a method and system for reusing antennas in a multi-antenna system Certain aspects of the invention may comprise suppressing a blocking signal received via at least one of a plurality of receiving antennas that is unused within a wideband diversity radio frequency (RF) receiver comprising a plurality of receiving antennas, when the wideband diversity RF receiver is operating in a narrowband receiving mode. The phase of the combined blocking signal and received data signal at the unused antenna may be adjusted to suppress the blocking signal.

Figure 1:
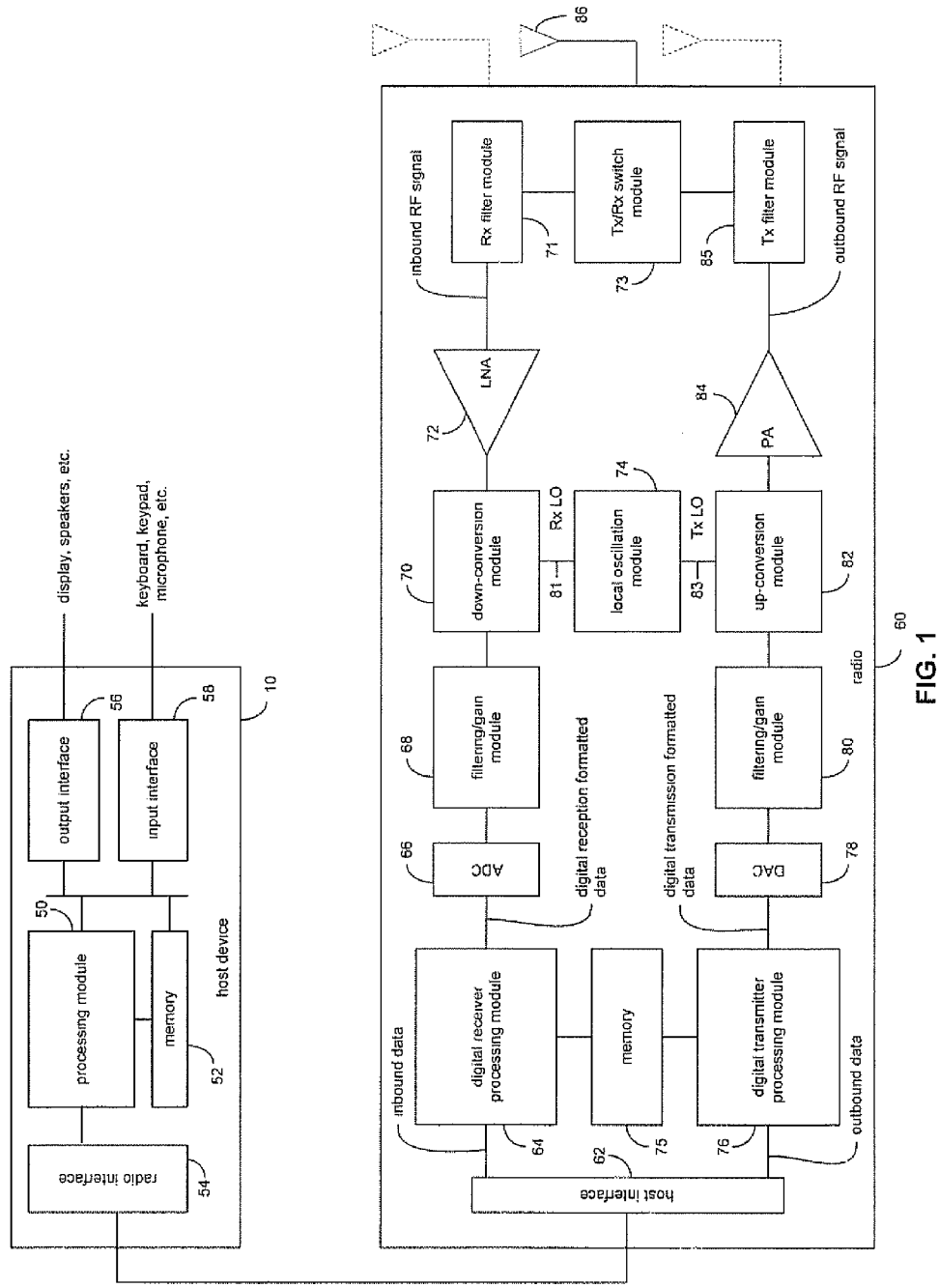
FIG. 1 is a block diagram illustrating a wireless communication host device and an associated radio, in accordance with an embodiment of the invention.

FIG. 1 is a block diagram illustrating a wireless communication host device and an associated radio, in accordance with an embodiment of the invention. Referring to FIG. 1, there is shown a wireless communication host device 10 and an associated radio 60.

The wireless communication host device 10 may comprise a processing module 50, a memory 52, a radio interface 54, an input interface 58 and an output interface 56. The processing module 50 and the memory 52 may be enabled to execute a plurality of instructions. For example, for a cellular telephone host device, the processing module 50 may be enabled to perform the corresponding communication functions in accordance with a particular cellular telephone standard.

The radio interface 54 may be enabled to allow data to be received from and transmitted to the radio 60. The radio interface 54 may be enabled to provide the data received from the radio 60 to the processing module 50 for further processing and/or routing to the output interface 56. The output interface 56 may be enabled to provide connectivity to an output device such as a display, monitor, or speakers such that the received data may be displayed. The radio interface 54 may be enabled to provide data from the processing module 50 to the radio 60. The processing module 50 may be enabled to receive the outbound data from an input device such as a keyboard, keypad, or microphone via the input interface 58 or generate the data itself The processing module 50 may be enabled to perform a corresponding host function on the data received via input interface 58 and/or route it to radio 60 via radio interface 54.

For cellular telephone hosts, radio 60 may be a built-in component For personal digital assistants hosts, laptop hosts, and/or personal computer hosts, the radio 60 may be built-in or an externally coupled component The radio 60 may comprise a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 may be shared by the transmit and receive paths as regulated by the Tx/Rx switch module 73.

The digital receiver processing module 64 and the digital transmitter processing module 76, in combination with operational instructions stored in the memory 75, may be enabled to execute digital receiver functions and digital transmitter functions, respectively The digital receiver functions may comprise, but are not limited to, demodulation, constellation demapping, decoding, and/or descrambling. The digital transmitter functions may comprise, but are not limited to, scrambling, encoding, constellation mapping, and modulation. The digital receiver and the transmitter processing modules 64 and 76, respectively, may be implemented using a shared processing device, individual processing devices, or a plurality of processing devices, for example, a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The memory 75 may be a single memory device or a plurality of memory devices. For example, the memory 75 may be a read-only memory, random access memory, volatile memory, non-volatile memory, static memory, dynamic memory, flash memory, and/or any device that stores digital information. When the digital receiver processing module 64 and/or the digital transmitter processing module 76 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry The memory 75 may be enabled to store, and digital receiver processing module 64 and/or digital transmitter processing module 76 may be enabled to execute, operational instructions corresponding to at least some of the functions illustrated herein.

In operation, the radio 60 may be enabled to receive outbound data from the wireless communication host device 10 via host interface 62. The host interface 62 may be enabled to route outbound data to the digital transmitter processing module 76 The digital transmitter processing module 76 may be enabled to process the outbound data in accordance with a particular wireless communication standard or protocol, for example, IEEE 802.11a, IEEE 802.11b, and Bluetooth to produce digital transmission formatted data. The digital transmission formatted data may be a digital baseband signal or a digital low IF signal, where the low IF may be in the frequency range of one hundred kilohertz to a few megahertz, for example.

The digital-to-analog converter 78 may be enabled to convert the digital transmission formatted data from the digital domain to the analog domain. The filtering/gain module 80 may be enabled to filter and/or adjusts the gain of the analog baseband signal prior to providing it to the up-conversion module 82. The up-conversion module 82 may be enabled to directly convert the analog baseband signal, or low IF signal, into an RF signal based on a transmitter local oscillation 83 provided by the local oscillation module 74A The power amplifier 84 may enable amplification of the RF signal to produce an outbound RF signal, which may be filtered by the transmitter filter module 85. The antenna 86 may be enabled to transmit the outbound RF signal to a targeted device such as a base station, an access point and/or another wireless communication device.

The radio 60 may be enabled to receive an inbound RF signal via antenna 86, which was transmitted by a base station, an access point, or another wireless communication device The antenna 86 may be enabled to communicate the inbound RF signal to the receiver filter module 71 via Tx/Rx switch module 73, where Rx filter module 71 bandpass filters inbound RF signals The Rx filter module 71 may be enabled to communicate the filtered RF signal to the low noise amplifier 72, which may amplify the inbound RF signal to generate an amplified inbound RF signal. The low noise amplifier 72 may be enabled to communicate the amplified inbound RF signal to the down-conversion module 70, which may directly convert the amplified inbound RF signal into an inbound low IF signal or baseband signal based on a receiver local oscillation 81 provided by local oscillation module 74. The down-conversion module 70 may be enabled to communicate the inbound low IF signal or baseband signal to the filtering/gain module 68. The filtering/gain module 68 may be enabled to filter and/or attenuate the inbound low IF signal or the inbound baseband signal to produce a filtered inbound signal.

The analog-to-digital converter 66 may be enabled to convert the filtered inbound signal from the analog domain to the digital domain to generate digital reception formatted data The digital receiver processing module 64 may be enabled to decode, descramble, demap, and/or demodulate digital reception formatted data to recapture inbound data. The host interface 62 may be enabled to communicate the recaptured inbound data to the wireless communication host device 10 via the radio interface 54.

The local oscillation module 74 may be enabled to adjust an output frequency of a received local oscillation signal. The local oscillation module 74 may be enabled to receive a frequency correction input to adjust an output local oscillation signal to generate a frequency corrected local oscillation signal output.

Figure 2:
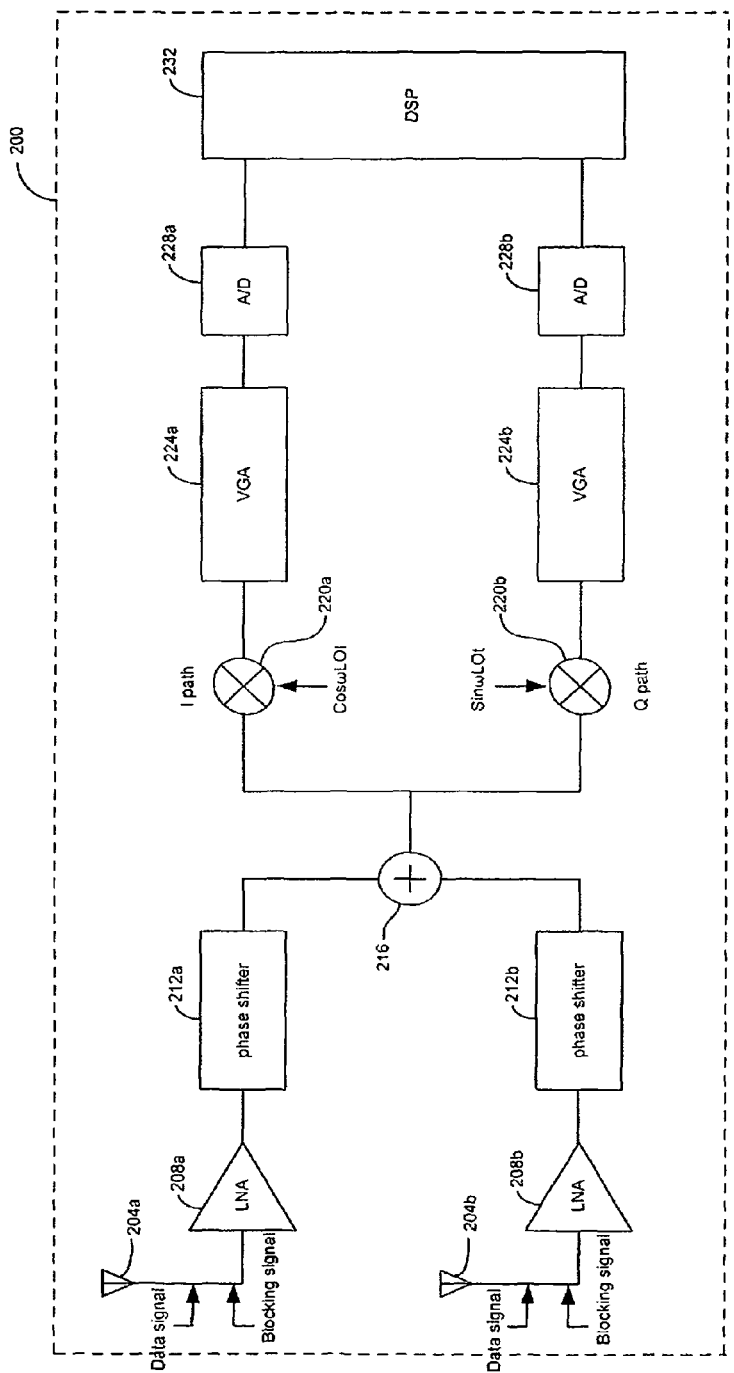
FIG. 2 is a block diagram of an exemplary wideband diversity radio frequency (RF) receiver, in accordance with an embodiment of the invention.

FIG. 2 is a block diagram of an exemplary wideband diversity radio frequency (RF) receiver, in accordance with an embodiment of the invention. Referring to FIG. 2, there is shown a wideband diversity radio frequency (RF) receiver 200. The wideband diversity radio frequency (RF) receiver 200 may comprise a plurality of antennas 204 and 205 that may be enabled to receive multi-path components of an in-going RF signal. The plurality of antennas 204a and 204b may be enabled to communicate the in-going RF signals to a plurality of low noise amplifiers (LNAs) 208a and 208b The plurality of LNAs 208a and 208b may comprise suitable logic, circuitry and/or code that may be enabled to amplify the received multi-path components and communicate the amplified signals to a plurality of phase shifters 212a and 212b. The plurality of phase shifters 212a and 212b may comprise suitable logic, circuitry and/or code that may be enabled to phase shift the multi-path components to generate phase-aligned signal current components to a combiner 216.

The combiner 216 may be enabled to generate a combined in-going RF signal to a plurality of mixing blocks 220a and 220b. The plurality of mixing blocks 220a and 220b may be enabled to generate in-phase (I) and quadrature phase (Q) path components at a frequency shifted frequency. The frequency shifted frequency may be either to a baseband frequency or intermediate frequency signal The frequency shifted I and Q path components may be communicated to a plurality of variable gain amplifiers (VGAs) 224a and 224b. The plurality of VGAs 224a and 224b may comprise suitable logic, circuitry and/or code that may be enabled to perform variable gain low-pass/band-pass filtering. The plurality of VGAs 224a and 224b may comprise a plurality of filters and/or amplifiers The plurality of VGAs 224a and 224b may be enabled to generate low-pass/band-pass filtered and amplified in-going frequency shifted continuous waveform signals to a plurality of analog-to-digital converters 228a and 228b. The plurality of analog-to-digital converters 228a and 228b may comprise suitable logic, circuitry and/or code that may be enabled to convert the received analog signals to digital signals and communicate the ingoing digital signals to a digital signal processor 232 for subsequent processing.

In one embodiment of the invention, the digital signal processor 232 may be operating in accordance with one or more standards, including but not limited to, IEEE 802.11, Bluetooth, advanced mobile phone services (AMPS), global systems for mobile communications (GSM), code division multiple access (CDMA), local multi-point distribution systems (LMDS), multi-channel-multi-point distribution systems (MMDS), and/or variations thereof. In an exemplary embodiment of the invention, the digital signal processor 232 may be coupled to the plurality of phase shifters 212a and 212b and may be an integrated digital controller with multiple inputs and outputs, such as a transmit data output and a receive data input. In the illustrated receiver 200, each of the phase shifters 212a and 212b may be coupled to a corresponding one of the antennas 204a or 204b via the LNA 208a or 208b. In one embodiment of the invention, each of the phase shifters 212a and 212b may be enabled to provide a 0 to 360 degrees of phase shift.

In accordance with a embodiment of the invention, the wideband diversity RH receiver 200 may comprise a plurality of receiving antennas 204a and 204b for diversity processing of wideband RF signals when operating in a wideband mode, for example, W-CDMA. When the wideband diversity RF receiver 200 is operating in a narrowband mode, at least a portion of a plurality of antennas may be unused. For example, the antenna 204b may be unused in a narrowband mode of operation. The wideband mode of operation may be for a bandwidth greater than 1 MHz, for example. The narrowband mode of operation may be for a bandwidth less than 300 kHz, for example, wherein the fading across the channel may be almost flat.

When operating in a narrowband mode, at least one of the unused antennas, for example, antenna 204b may be enabled to receive a blocking signal along with a data signal. LNA 208b may be enabled to amplify the combined blocking signal and the received data signal. The phase shifter 212b may be enabled to adjust the phase of the combined blocking signal and the received data signal in order that the blocking signal maybe suppressed at combiner 216. The mixing block 220a may be enabled to generate an in-phase (I) component of the amplified received data signal. The mixing block 220b may be enabled to generate a quadrature component of the amplified received data signal. The plurality of VGAs 224a and 224b may be enabled to filter the amplified received data signal. In accordance, with an embodiment of the invention, the signal to noise ratio (SNR) of the receiver channel may be increased by suppressing the blocking signal and amplifying the received data signal.

Figure 3:
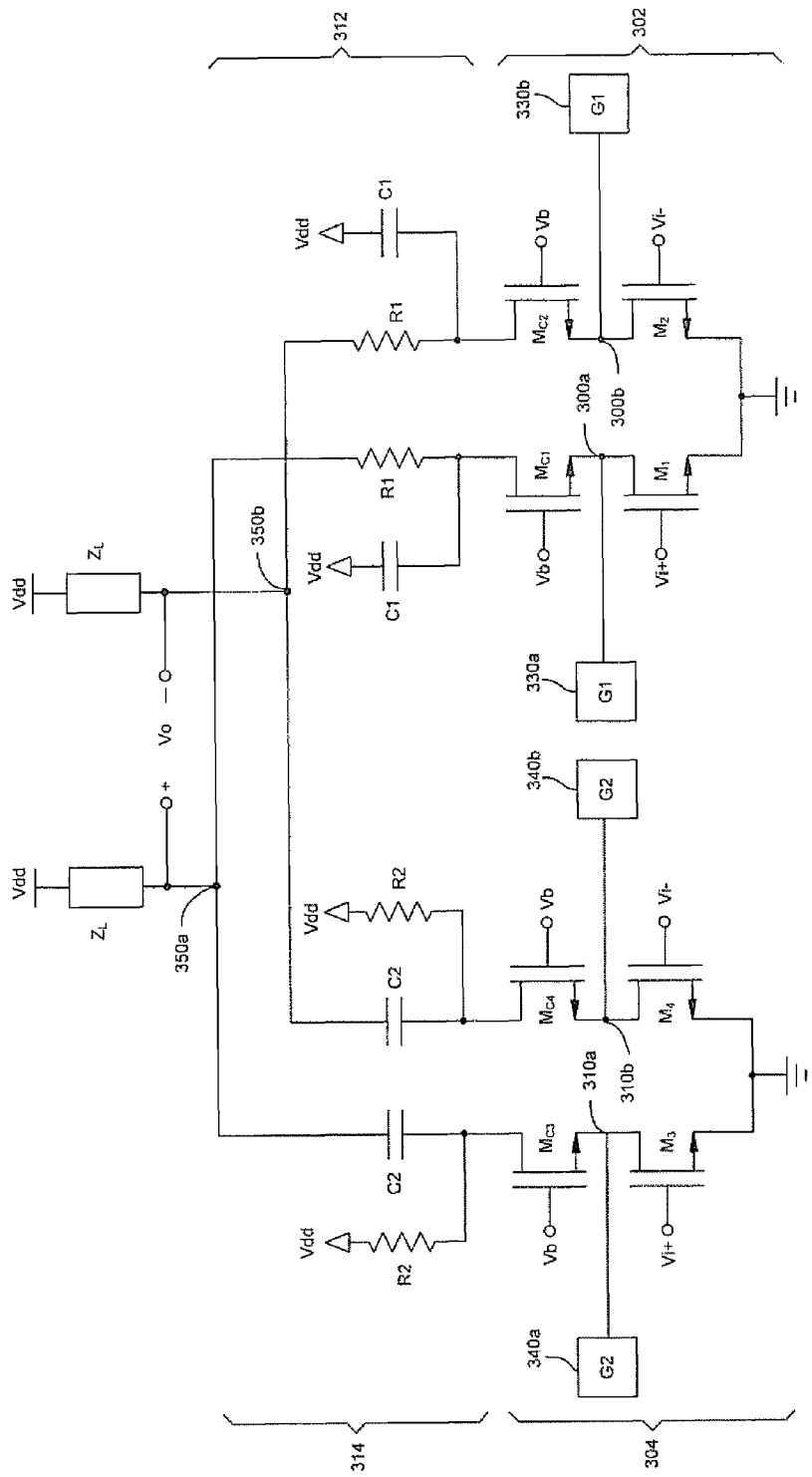
FIG. 3 is a functional schematic diagram of a circuit including two differential phase shifters and a combiner with reference to FIG. 2, in accordance with an embodiment of the invention.

FIG. 3 is a functional schematic diagram of a circuit including two differential phase shifters and a combiner with reference to FIG. 2, in accordance with an embodiment of the invention. Referring to FIG. 3, there is shown a first differential pair 302, a second differential pair 304, a plurality of RC circuit pairs 312, and 314. The first differential pair 302 and the second differential pair 304 may comprise differential inputs Vi+, Vi– that may be fed from an output of a previous stage. During narrowband mode operation, a received blocking signal and received data signal at the unused antenna 204b may be communicated to the first differential pair 302 and a blocking signal and received data signal at the antenna 204a may be communicated to the second differential pair 304. The first and second differential pairs 302, and 304 may be enabled to convert voltage to current. A plurality of 900 phase shifted signals may be generated by passing the currents through the RC circuit pairs 312, 314. The 90° phase shifted signals may be combined with each other at nodes 350a, 350b to generate a final signal. By changing the gain of each of the first and second differential pairs 302, 304, via the gain controllers 330a, 330b, and 340a, 340b respectively, the desired phase or phase angle θ may be generated at the output of the nodes 350a, 350b to suppress or cancel the blocking signal. The polarity of the input or output of the first and second differential pairs 302, 304 may be adjusted to achieve up to 360° phase shifting. The loads $Z_L$ may be coupled to the first and second differential pairs 302, 304 via nodes 350a, 350b. The first and the second differential pairs 302, 304 may comprise cascoded transistor pairs with n-channel MOSFETs, for example, $M_{c1}$ and $M_1$ serially coupled such that the source of a cascode transistor, for example, the MOSFET $M_{c1}$ may be coupled to the drain of a transconductance transistor, for example, the MOSFET $M_1$ via a connection-control node, for example, 300a.

The plurality of gain controllers 330a, 330b, 340a, and 340b may be coupled to the plurality of connection-control nodes 300a, 300b, 310a, and 310b respectively. At least one of the differential input voltages Vi+, Vi– may be coupled to each of the transconductance transistors ($M_1$-$M_4$) of the first and second differential pairs 302, 304, The transconductance transistors ($M_1$-$M_4$) may be enabled to change voltages into currents The cascode transistors ($M_{c1}$-$M_{c4}$) of the first and second differential pairs 302, 304 may be coupled to control voltage Vb. The cascode transistors ($M_{c1}$-$M_{c4}$) may be included for impedance balancing, gain control, increasing output impedance, reducing an effective capacitance input, and/or improving linearity.

In operation, the first differential pair 302 may be enabled to convert a differential input voltage into a first differential current as a function of an input voltage Vi+, Vi–. The gain controllers 330a, 330b via the connection-control nodes 300a, 300b may be enabled to control a gain of the first differential current. The second differential pair 304 may be enabled to control the output current and gain of the second differential pair 304. For example, the gain controllers 340a, 340b via the connection-control nodes 310a, 310b may be enabled to control a gain of a second differential current after the second differential pair 304 current converts a differential input voltage into the second differential current in accordance with the input voltage Vi+, Vi–.

The final signal may be generated by passing the currents outputted from the first and second differential pairs 302, 304 through the RC-CR circuit pairs 312, 314, and the 90° phase shifted signals may be generated and added in the nodes 350a, 350b and/or the loads $Z_L$. The desired phase or phase angle θ may be generated after adding the two currents by changing the gain of the each of the first and second differential pairs 302, 304 via the gain controllers 330a, 330b, 340a, 340b, The polarity of the currents initially generated by one or both of the first and second differential pairs 302, 304 may be changed to generate up to 360° phase shifting.

Figure 4:
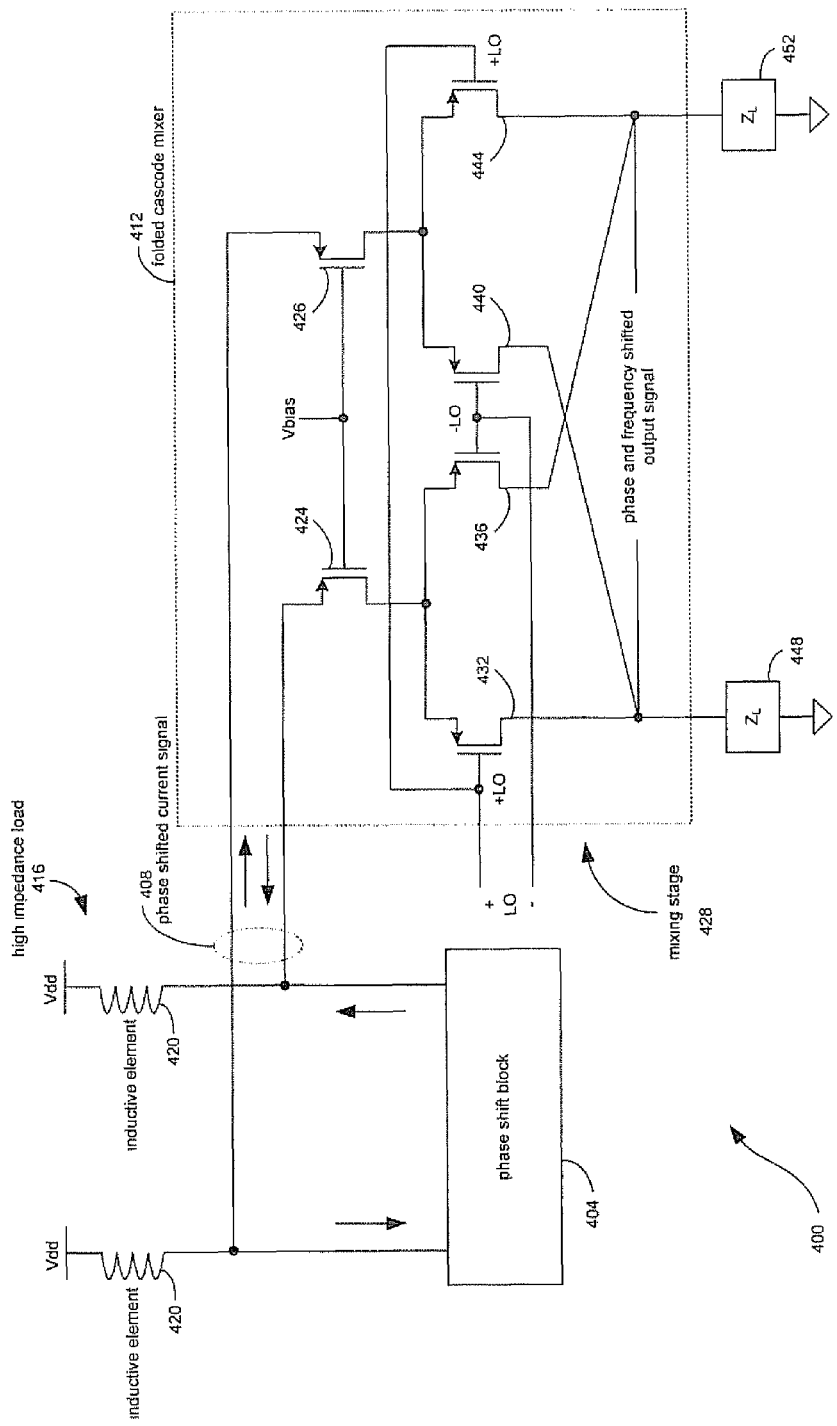
FIG. 4 is a functional schematic diagram of an integrated phase shift mixer, in accordance with an embodiment of the invention.

FIG. 4 is a functional schematic diagram of an integrated phase shift mixer, in accordance with an embodiment of the invention. Referring to FIG. 4, there is shown an integrated phase shift mixer 400 that comprises a phase shift block 404, a high impedance load 416, a mixing stage 428, and plurality of load devices 448 and 452.

The high impedance load 416 may comprise a plurality of inductive elements 420. The mixing stage 428 may comprise a folded cascode mixer 412. The folded cascode mixer 412 may comprise a plurality of p-channel MOSFETs 424, 426, 432, 436, 440, and 444. The phase shift block 404 may be enabled to generate a phase shifted current signal 408 to the folded cascode mixer 412 to suppress or cancel the blocking signal from the unused antenna 204 during a narrowband mode of operation. The output of the phase shift block 404 may be coupled to the high impedance load 416, which may be coupled to a supply $V_{dd}$.

The folded cascode mixer 412 may be configured to provide a substantially low input impedance in comparison to the high impedance load 416. Accordingly, the phase shift block 404 may be enabled to generate the phase shifted current signal 408 that may flow into the folded cascode mixer 412 instead of into the high impedance load 416. The plurality of inductive elements 420 may be replaced by other known load devices including resistors, capacitors, RC tanks, transistors or any combination of the same with or without inductive elements.

The output of the phase shift block 404 may be coupled to the source terminals of a pair of the p-channel MOSFETs, 424 and 426. The MOSFETs 424 and 426 are cascode devices and may provide a low impedance cascode input The drain terminals of the cascode MOSFETs 424 and 426 may be coupled to a mixer switching block that may comprise, for example, four p-channel MOSFETs 432, 436, 440, 444. The drain terminal of the MOSFET 424 may be coupled to the source terminals of the MOSFETs 432 and 436 while the drain terminal of the MOSFET 426 may be coupled to the source terminal of the MOSFETs 440 and 444. The p-channel MOSFETs 432, 436, 440, and 444 may be cross coupled as shown in FIG. 4 and may be coupled to the load devices 448, 452. The load devices 448 and 452 may be resistive devices, for example Notwithstanding, other types of load circuits or devices may be used. The drain terminals of the MOSFETs 432 and 440 may be coupled to each other and to load device 448, while the drain terminals of MOSFETs 436 and 444 may be coupled to each other and to load device 452.

In accordance with another embodiment of the invention, the input signal may be applied in the form of a current to the source terminals of the p-channel MOSFETs 424 and 426. The gate terminals of the MOSFETs 424 and 426 may be coupled to receive a bias signal for DC operation.

In an alternate embodiment of the invention, the folded cascode mixer 412 may not have the low impedance cascode input provided by the MOSFETs 424 and 426. Accordingly, the phase shifted current signal 408 may be provided directly to the source terminals of the MOSFETs 432, 436, 440 and 444. While the described embodiment is for a phase shift mixer that may be operable to provide a phase and frequency shifted ingoing signal for a wideband diversity radio frequency (RF) receiver, the folded cascode mixer 412 may be used with any type of transconductance or current mode source. For example, in a radio receiver that does not include a phase shift block, the above described folded cascode mixer 412, or a mixer without the low impedance cascode inputs, may be coupled directly to a low noise amplifier to receive an output of the low noise amplifier as a current signal.

In accordance with another embodiment of the invention, a mixer with a low impedance input in combination with a high impedance load in a prior stage may be formed to prompt current from the output of the prior stage to flow into the mixer instead of the load device or devices.

Figure 5:
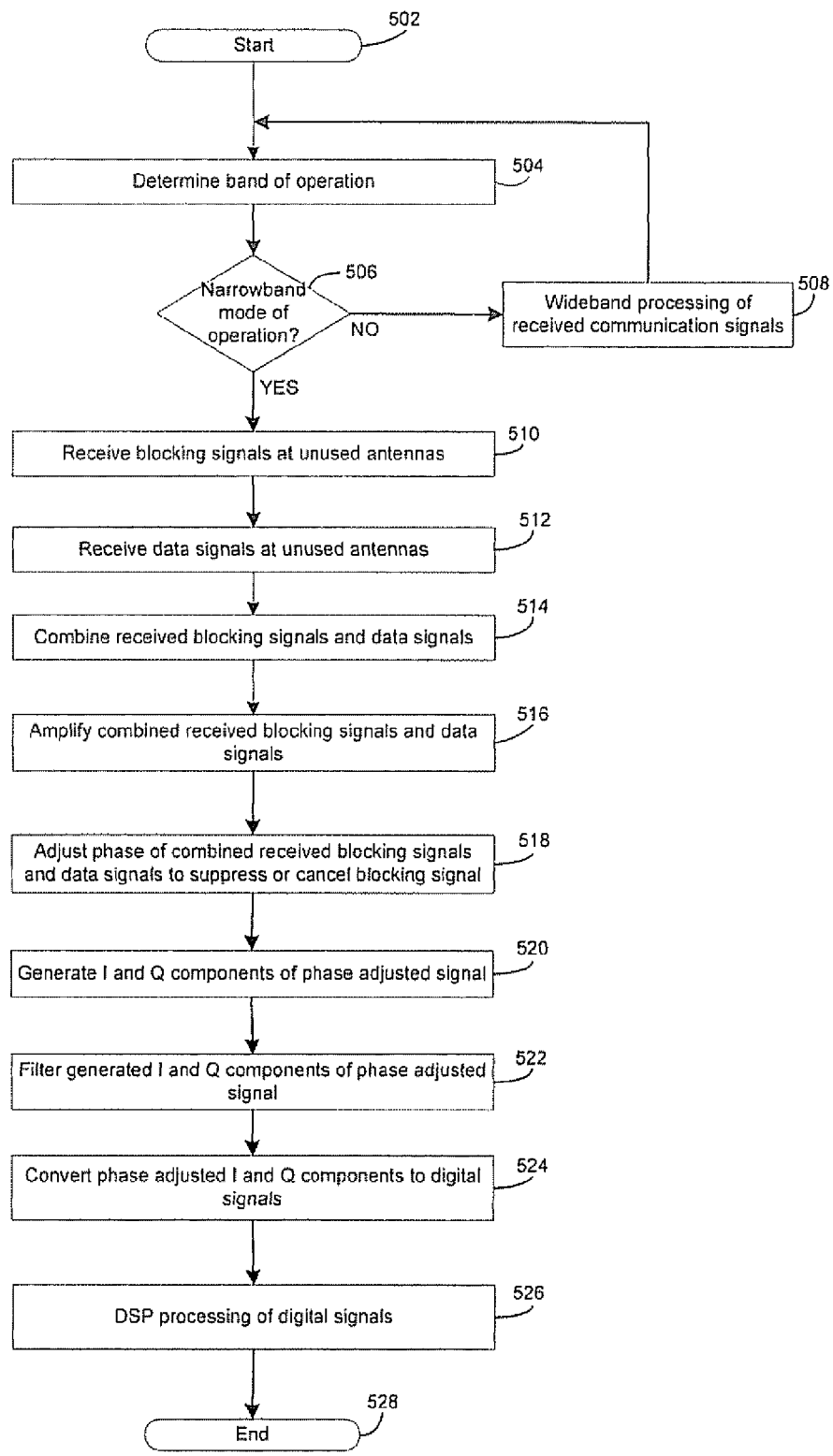
FIG. 5 is a flowchart illustrating exemplary steps for reusing antennas in a multi-antenna system, in accordance with an embodiment of the invention.

FIG. 5 is a flowchart illustrating exemplary steps for reusing antennas in a multi-antenna system, in accordance with an embodiment of the invention. Referring to FIG. 5, exemplary steps may begin at step 502. In step 504, the band of operation of the wideband diversity RF receiver 200 may be determined. The wideband diversity RF receiver 200 may be operating in wideband mode, for example, W-CDMA or in narrowband mode, for example, GSM or enhanced data rates for GSM evolution (EDGE). In step 506, it may be determined whether the wideband diversity RF receiver 200 is operating in a narrowband mode of operation. If the wideband diversity RF receiver 200 is not operating in a narrowband mode of operation, control passes to step 508. In step 508, wideband processing of the received RF signals may be performed. Control then returns to step 504.

If the wideband diversity RF receiver 200 is operating in a narrowband mode of operation, control passes to step 510. In step 510, at least one blocking signal may be received via at least one of the unused antennas, for example, antenna 204b. In step 512, at least one data signal may be received via at least one of the unused antennas, for example, antenna 204b. In step 514, the blocking signal and the received data signal may be combined at the unused antenna 204b. In step 516, the combined blocking signal and the received data signal may be amplified. In step 518, the phase of the combined blocking signal and the received data signal may be adjusted to suppress the blocking signal. In step 520, an in-phase (I) component and a quadrature (Q) component of the amplified combined blocking signal and the received data signal may be generated. In step 522, the combined blocking signal and the received data signal may be filtered. In step 524, the phase adjusted I and Q components of the received signal may be converted to digital signals. In step 526, the digital signals may be processed by a DSP. Control then passes to end step 528.

In accordance with an embodiment of the invention, a method and system for reusing antennas in a multi-antenna system may comprise a wideband diversity RF receiver 200 that may comprise a plurality of receiving antennas 204a and 204b for diversity processing of wideband RF signals when operating in a wideband mode, for example, W-CDMA. When the wideband diversity RF receiver 200 is operating in a narrowband mode, at least a portion of a plurality of antennas may be unused. For example, antenna 204b may be unused in a narrowband mode of operation.

When operating in a narrowband mode, at least one of the unused antennas, for example, antenna 204b may be enabled to receive a blocking signal along with a data signal. The block LNA 208b may be enabled to amplify the combined blocking signal and the received data signal. The phase shifter 212b may be enabled to adjust the phase of the combined blocking signal and the received data signal to suppress the blocking signal. The mixing block 220a may be enabled to generate an in-phase (I) component of the amplified combined blocking signal and the received data signal. The mixing block 220b may be enabled to generate a quadrature component of the amplified combined blocking signal and the received data signal. The plurality of VGAs 224a and 224b may be enabled to filter the combined blocking signal and the received data signal. The signal to noise ratio (SNR) of the receiver channel may be increased by suppressing the blocking signal and amplifying the received data signal.

Another embodiment of the invention may provide a machine-readable storage, having stored thereon, a computer program having at least one code section executable by a machine, thereby causing the machine to perform the steps as described above for reusing antennas in a multi-antenna system. For example, any one or more of the components in the wireless communication host device 10 and/or the radio 60 may be controlled via code such as software and/or firmware. In this regard, in an exemplary embodiment of the invention, any one or more of the digital receiver processing module 64, ADC 66, filtering/gain module 68, down-conversion module 70, LNA 72 and Rx filter module 71 may be programmably controlled by code comprising software and/or firmware. In another exemplary embodiment of the invention, any one or more of the digital transmitter processing module 76, DAC 78, filtering/gain module 80, up-conversion module 82, PA 84, and Tx filter module 86, may be programmably controlled by code comprising software and/or firmware.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication network, the method comprising:
   in a wideband diversity radio frequency (RF) receiver comprising a plurality of receiving antennas:

determining whether said wideband diversity RF receiver is operating in a narrowband receiving mode;

suppressing a blocking signal received via at least one of said plurality of receiving antennas that is unused when said determining determines that said wideband diversity RF receiver is operating in said narrowband receiving mode.

2. The method according to claim 1, comprising receiving said blocking signal and a received data signal at said at least one of said plurality of receiving antennas that is unused.

3. The method according to claim 2, comprising amplifying said blocking signal and said received data signal.

4. The method according to claim 1, comprising generating at least one of an in-phase (I) component and a quadrature (Q) component of a received data signal.

5. The method according to claim 2, comprising adjusting a phase of said blocking signal and said received data signal prior to suppressing said blocking signal.

6. The method according to claim 2, comprising filtering said received data signal.

7. The method according to claim 1, comprising increasing a signal to noise ratio of a channel based on said suppressed blocking signal.

8. A machine-readable storage medium having stored thereon, a computer program having at least one code section for processing signals in a communication network, the at least one code section being executable by a machine for causing the machine to perform steps comprising:

in a wideband diversity radio frequency (RF) receiver comprising a plurality of receiving antennas:

determining whether said wideband diversity RF receiver is operating in a narrowband receiving mode;

suppressing a blocking signal received via at least one of said plurality of receiving antennas that is unused when said determining determines that said wideband diversity RF receiver is operating in said narrowband receiving mode.

9. The machine-readable storage medium according to claim 8, wherein said at least one code section comprises code for receiving said blocking signal and a received data signal at said at least one of said plurality of receiving antennas that is unused.

10. The machine-readable storage medium according to claim 9, wherein said at least one code section comprises code for amplifying said blocking signal and said received data signal.

11. The machine-readable storage medium according to claim 9, wherein said at least one code section comprises code for generating at least one of: an in-phase (I) component and a quadrature (Q) component of a received data signal.

12. The machine-readable storage medium according to claim 9, wherein said at least one code section comprises code for adjusting a phase of said received blocking signal and said received data signal prior to suppressing said blocking signal.

13. The machine-readable storage medium according to claim 9, wherein said at least one code section comprises code for filtering said received data signal.

14. The machine-readable storage medium according to claim 8, wherein said at least one code section comprises code for increasing a signal to noise ratio of a channel based on said suppressed blocking signal.

15. A system for processing signals in a communication network, the system comprising:

at least one circuit within a wideband diversity radio frequency (RF) receiver comprising a plurality of receiving antennas, said at least one circuit configured to:

determine whether said wideband diversity RF receiver is operating in a narrowband receiving mode;

suppress a blocking signal received via at least one of said plurality of receiving antennas that is unused when said determining determines that said wideband diversity RF receiver is operating in said narrowband receiving mode.

16. The system according to claim 15, wherein said at least one circuit enables receiving said blocking signal and a received data signal at said at least one of said plurality of receiving antennas that is unused.

17. The system according to claim 16, wherein said at least one circuit enables amplification of said blocking signal and said received data signal.

18. The system according to claim 16, wherein said at least one circuit enables generation of at least one of: an in-phase (I) component and a quadrature (Q) component of a received data signal.

19. The system according to claim 16, wherein said at least one circuit enables adjustment of a phase of said received blocking signal and said received data signal prior to suppressing said blocking signal.

20. The system according to claim 16, wherein said at least one circuit enables filtering of said received blocking signal and said received data signal.

21. The system according to claim 15, wherein said at least one circuit enables increasing a signal to noise ratio of a channel based on said suppressed blocking signal.

* * * * *